(12) United States Patent
Ayush et al.

(10) Patent No.: US 11,238,093 B2
(45) Date of Patent: Feb. 1, 2022

(54) VIDEO RETRIEVAL BASED ON ENCODING TEMPORAL RELATIONSHIPS AMONG VIDEO FRAMES

(71) Applicant: ADOBE INC., San Jose, CA (US)

(72) Inventors: Kumar Ayush, Uttar Pradesh (IN); Harnish Lakhani, Maharashtra (IN); Atishay Jain, Delhi (IN)

(73) Assignee: ADOBE INC., San Jose, CA (US)

( * ) Notice: Subject to any disclaimer, the term of this patent is extended or adjusted under 35 U.S.C. 154(b) by 177 days.

(21) Appl. No.: 16/601,773

(22) Filed: Oct. 15, 2019

(65) Prior Publication Data

US 2021/0109966 A1    Apr. 15, 2021

(51) Int. Cl.
*G06F 16/732* (2019.01)
*G06N 3/08* (2006.01)
*H04N 19/59* (2014.01)
*G06F 16/74* (2019.01)

(52) U.S. Cl.
CPC ........ *G06F 16/7328* (2019.01); *G06F 16/743* (2019.01); *G06N 3/08* (2013.01); *H04N 19/59* (2014.11)

(58) Field of Classification Search
None
See application file for complete search history.

(56) References Cited

U.S. PATENT DOCUMENTS 8,311,277 B2 * 11/2012 Peleg ................... G06F 16/739
                                                              382/103
2014/0184803 A1 * 7/2014 Chu ...................... G06T 7/292
                                                              348/159
2020/0258241 A1 * 8/2020 Liu ..................... G06K 9/00744
2021/0109966 A1 * 4/2021 Ayush ..................... H04N 19/46

OTHER PUBLICATIONS

Hu, et al., "A Survey on Visual Content-Based Video Indexing and Retrieval", IEEE Transactions on Systems, Man, and Cybernetics—Part C: Applications and Reviews, vol. 41, No. 6, Nov. 2011, pp. 797-819.
Lee, et al., "Where to Play: Retrieval of Video Segments using Natural-Language Queries", Under Review in ACM MM, Apr. 2017, arXiv:1707.00251v1 [cs.CV] Jul. 2, 2017 (8 pages).
Johnson, et al., "DenseCap: Fully Convolutinal Localization Networks for Dense Captioning", arXiv:1511.07571v1 [cs.CV] Nov. 24, 2015, (10 pages).

* cited by examiner

*Primary Examiner* — Tahmina N Ansari
(74) *Attorney, Agent, or Firm* — F. Chau & Associates, LLC

(57) ABSTRACT

Systems and methods for content-based video retrieval are described. The systems and methods may break a video into multiple frames, generate a feature vector from the frames based on the temporal relationship between them, and then embed the feature vector into a vector space along with a vector representing a search query. In some embodiments, the video feature vector is converted into a text caption prior to the embedding. In other embodiments, the video feature vector and a sentence vector are each embedded into a common space using a join video sentence embedding model. Once the video and the search query are embedded into a common vector space, a distance between them may be calculated. After calculating the distance between the search query and set of videos, the distances may be used to select a subset of the videos to present as the result of the search.

20 Claims, 15 Drawing Sheets

VIDEO RETRIEVAL BASED ON ENCODING TEMPORAL RELATIONSHIPS AMONG VIDEO FRAMES

BACKGROUND

The following relates generally to video retrieval, and more specifically to content-based video retrieval.

A variety of techniques have been used for storing and retrieving videos. However, conventional video retrieval processes do not consider video content. For example, some video hosting platforms provide a search function based on video metadata. This type of search function is not effective if the user is searching for content not captured by the metadata. The search function is even less effective if the metadata is incorrect or not sufficiently descriptive. Thus, these video retrieval systems fail to capture the temporal content of the video if the content creator does not provide enough information to cater to the users' needs.

In some cases, videos that include relevant content are omitted from search results because they are labeled with metadata irrelevant to the search query. In other cases, users must manually watch a large number of videos to find the content they want. Thus, there is a need in the art for improved systems and methods for video search.

SUMMARY

A method, apparatus, and non-transitory computer-readable medium for content-based video retrieval are described. Embodiments of the method, apparatus, and non-transitory computer-readable medium may select a plurality of video frames from a video clip, generate a video feature vector comprising a distinct set of values for each of the video frames, generate an encoded video information based on the video feature vector, where the encoded video information includes information based on the order of the video frames and has fewer dimensions than the video feature vector, embed the encoded video information using an embedding model, receive a search query from a user, embed a search query using the embedding model, calculate a distance between the embedded encoded video information and the embedded search query and provide an indication of the video clip to the user based on the calculated distance.

A method, apparatus, and non-transitory computer-readable medium for content-based video retrieval are described. Embodiments of the method, apparatus, and non-transitory computer-readable medium may generate a video feature vector based on a plurality of video frames from a video clip, encode the video feature vector to produce encoded video information, where the encoded video information has fewer dimensions than the video feature vector, decode the encoded video information to produce a caption sentence, embed the caption sentence using a sentence embedding model, receive a search query from a user, embed the search query using the sentence embedding model, calculate a distance between the embedded caption sentence and the embedded search query and provide an indication of the video clip to a user based on the calculated distance.

A method, apparatus, and non-transitory computer-readable medium for content-based video retrieval are described. Embodiments of the method, apparatus, and non-transitory computer-readable medium may generate a video feature vector based on a plurality of video frames from a video clip, encode the video feature vector to produce encoded video information, wherein the encoded video information has fewer dimensions than the video feature vector, embed the encoded video information using a joint video-sentence embedding model, wherein the joint video-sentence embedding model comprises a first input branch for the encoded video information and a second input branch for sentences, receive a search query from a user, embed the search query using the joint video-sentence embedding model, calculate a distance between the embedded encoded video information and the embedded search query and provide an indication of the video clip to a user based on the calculated distance.

DETAILED DESCRIPTION

Figure 1:
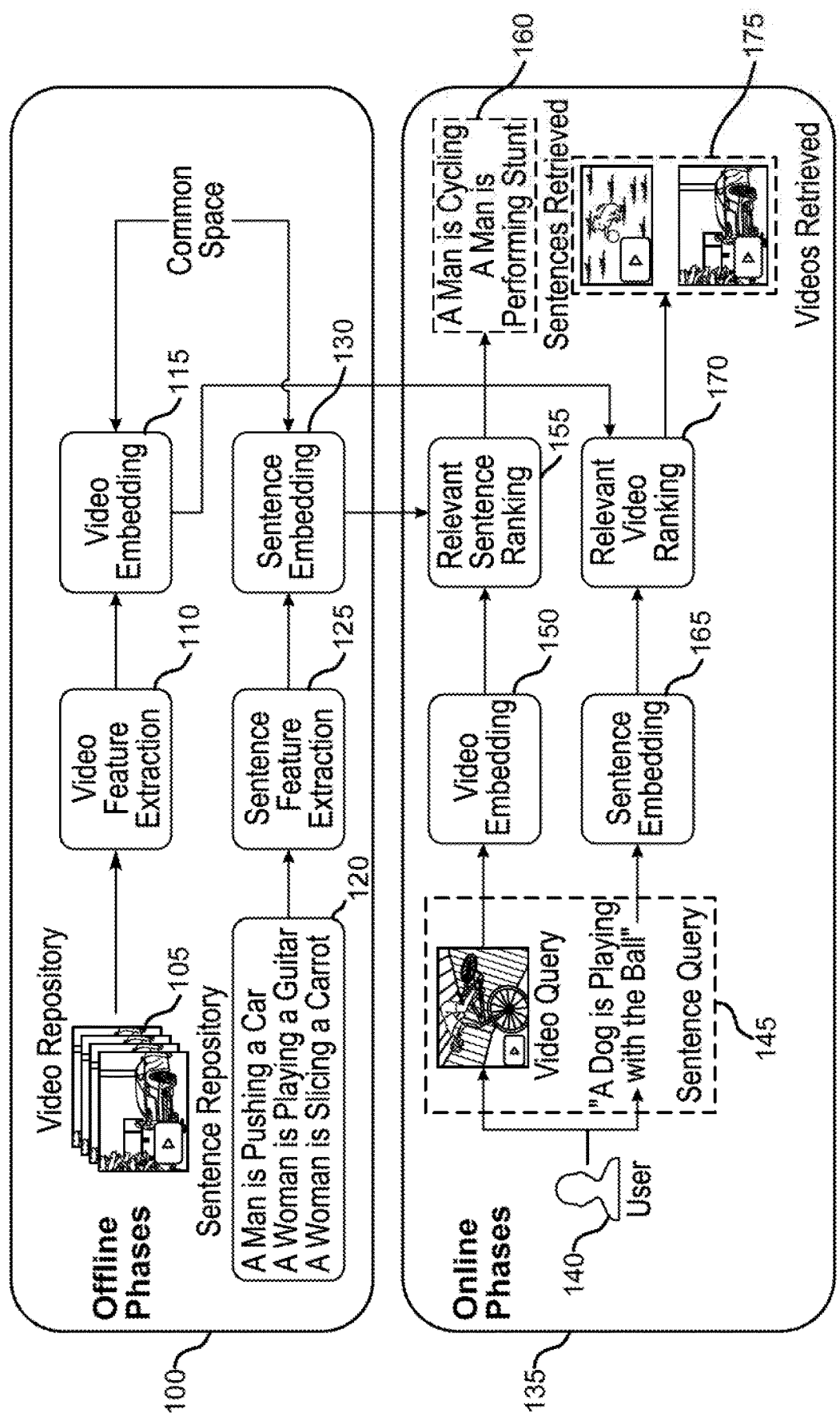
FIG. 1 shows an example of a video retrieval pipeline according to aspects of the present disclosure.

The present disclosure provides systems and methods of content-based video retrieval. A large amount of video content is created and hosted on a wide variety of platforms, but searching these videos can be difficult. Conventional search methods are based on video meta-data, but this data can be incomplete or insufficient. Thus, video search results based on this data may ignore relevant videos, or return videos whose content does not match the query. Furthermore, manually watching videos to obtain a better idea of their content can be very time consuming.

Content-based video retrieval systems have been proposed that utilize the ability of machine learning models to recognize objects in an image. However, these systems ignore relations among objects in the search query, the video, or both. For example, they may not distinguish between "man bites dog" and "dog bites man". Furthermore, conventional content-based video methods do not take into account the temporal content of the videos. Since the temporal relation among images may contain important elements of a video's meaning, ignoring the temporal aspect of a video can lead to unsatisfactory search results.

Therefore, the present disclosure provides systems and methods that compare the semantic content of textual queries and video clips. For example, some embodiments of the present disclosure break a video into multiple frames, generate a feature vector from the frames based on the temporal relationship between them, and then embed the feature vector into a vector space along with a vector representing a search query. In some embodiments, the video feature vector is converted into a text caption prior to the embedding. In other embodiments, the video feature vector and a sentence vector are each embedded into a common space using a joint video sentence embedding model. Once the video and the search query are embedded into a common vector space, a distance between them may be calculated. After calculating the distance between the search query and set of videos, the distances may be used to select a subset of the videos to present as the result of the search.

Therefore, by determining video content that takes into account temporal information, and embedding the video features into a common vector space along with a search query, improved search results may be provided that better capture the meaning of the videos. Thus, the results are more relevant to the query, and search time is reduced.

The following terms are used throughout the present disclosure:

The term "video feature vector" refers to a vector of information obtained from a set of video frames. The feature information may include low level information such as edges, corners, blobs, ridges, and colors or high level information such as the presence of a person, plant, animal, vehicle, or building. The video feature vector may also encode meta-data about the video as well as information about the order of the frames. In some cases, each frame corresponds to a unique set of values within the video feature vector. In some cases, the feature information is represented as a high-dimensional vector, and the meaning of the values in the vector may not have a simple, human readable interpretation.

The term "encoded video information" refers to a representation of the information from the video feature vector in an encoded space with a reduced number of dimensions. This dimensionality reduction may be achieved using recurrent neural network (RNN) encoder-decoder model with Long Short-term Memory (LSTM) cells. The LSTM cells may be used to capture information related to the temporal order of the frames (as represented in different portions of the feature vector).

The terms "embedding model" and "embedding space" refer to neural network (and the output of the network) that enables encoded video information to be compared to text information (e.g., a search query). In one embodiment of the present disclosure, the encoded video information is decoded to create a caption sentence for the video. Both the caption video and the search query may then be embedded using a sentence embedding model which maps sentences to vectors. In another embodiment of the present disclosure, the encoded video information and a vector representing a sentence (e.g., a search query) are embedded using separate branches of an embedding model that takes two different types of input (e.g., inputs having a different number of dimensions).

The term "distance" between elements of the embedding space is used to refer to whether the representations of two sentences, two videos, or a sentence and a video are similar to each other in the embedding space. The distance may be calculated using the Euclidean distance between two vectors, cosine similarity between vectors, or using any other suitable algorithm for calculating similarity between vectors in a vector space.

Thus, if a user provides a search query, the search query may be mapped into the embedding space and compared to other elements of the embedding space based on their distance from the search query. Video clips represented in the embedding space that are separated from the search query by a small distance (i.e., that are similar to the search query) may be returned as a response to the query.

As described herein, in one embodiment a neural language model projects the input videos to a sentence feature space, and a query is processed over this sentence feature space. However, in some cases, summarizing video using text may result in the loss of information. Therefore, in other embodiments sentences and the videos they represent may both be projected directly into a common feature space. Both video-to-sentence and sentence-to-video queries may be executed over this common feature space. In some cases, the separation of content identification and sentence generation may be avoided by learning to directly map videos to full human-provided sentences while learning a language model simultaneously conditioned on visual features.

The video retrieval system contains temporal features, where a sequence of frames on a time scale depicts the activity in the video. Thus, embodiments of the present disclosure improve video retrieval performance compared to conventional mechanisms over a wide set of queries. Various examples described herein combine multiple learning models over the video and natural language processing space, and develop a robust combined model that improves performance for content-based video retrievals. The present disclosure does not depend on the separation of content identification and sentence generation by learning to directly map videos to full human-provided sentences, learning a language model simultaneously conditioned on visual features.

FIG. 1 shows an example of a video retrieval pipeline according to aspects of the present disclosure. The example shown includes offline phase 100 and online phase 135. The offline phase 100 occurs prior to a search, and online phase 135 occurs during or after a search query is submitted by a user 140.

Offline phase 100 may include video repository 105, video feature extraction 110, video embedding 115, sentence repository 120, sentence feature extraction 125, and sentence embedding 130. During offline phase 100, videos from the video repository 105 and sentences from the sentence repository 120 will be used to create (and embed videos in) a common embedding space. Videos from video repository 105 undergo video feature extraction 110, and then video embedding 115. Similarly, sentences from sentence repository 120 undergo sentence feature extraction 125 and sentence embedding 130.

Sometime after the offline phase 100, the user 140 submits a search query 145. Online phase 135 may include the user 140, search query 145, video embedding 150, relevant sentence ranking 155, retrieved sentences 160, sentence embedding 165, video ranking 170, and retrieved videos 175.

When the user 140 provides the search query 145, the search query 145 (which may be in the form of a sentence or a video), the features for the query are extracted and embedded in a feature vector. The feature vector is then passed to sentence embedding 165 (or video embedding 150), and then to sentence ranking 155 (or video ranking 170). Then the system finds and returns retrieved sentences 160 or retrieved videos 175.

According to at least one embodiment, there are two types of queries. The first type of query is sentence-to-video, which can be achieved by first applying the preprocessing step to convert the query text to a sentence embedding using the sentence encoding model. The sentence embedding is then given as input to the sentence branch which generates the joint space embedding for the sentence embedding. The retrieval of relevant videos is based on the Euclidean distance between the joint embedding of the input sentence and the precomputed joint embeddings of the videos in the database. The result is displayed as a set of relevant videos based on increasing Euclidean distance.

The second type of query is video-to-sentence which can be the video input passed through the preprocessing step to output the video feature vector. This feature vector is given as an input to the encoder of the trained model to generate encoded video information. This is then passed to the video branch of the network to generate the joint embedding for the video branch. The retrieval of relevant sentences is based on the Euclidean distance between the joint embedding of the input video and the precomputed joint embeddings of the sentences in the database. The result is displayed as a set of relevant sentences based on increasing Euclidean distance.

Figure 2:
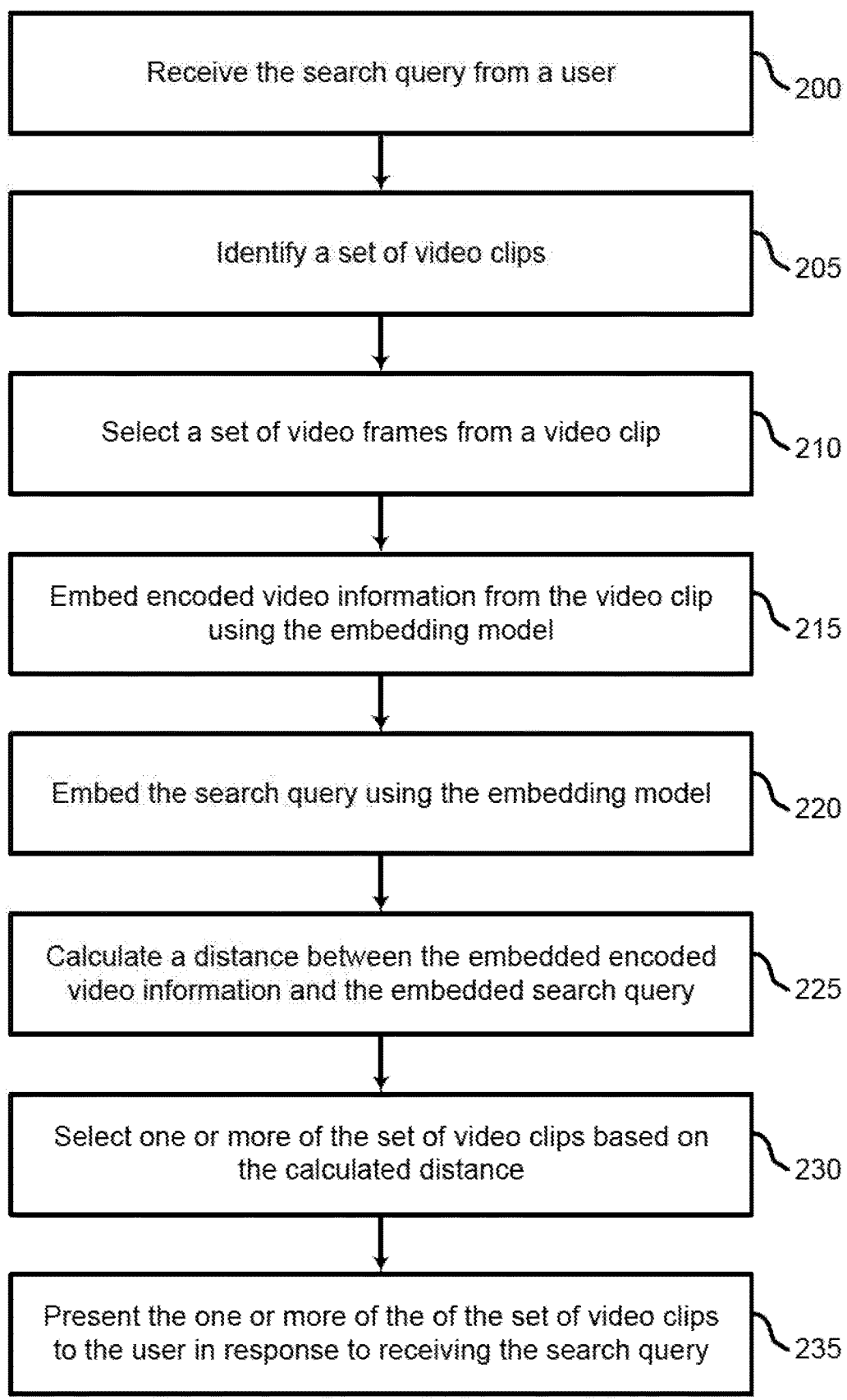
FIG. 2 shows an example of a process for content-based video retrieval according to aspects of the present disclosure.

FIG. 2 shows an example of a process for content-based video retrieval according to aspects of the present disclosure. In some examples, these operations may be performed by a system including a server performing a search on behalf of a user. The processes may be performed using special-purpose hardware. Generally, these operations may be performed according to the methods and processes described in accordance with aspects of the present disclosure. For example, the operations may be composed of various sub-steps or may be performed in conjunction with other operations described herein.

As discussed above with reference to FIG. 1, a content video retrieval system may include two phases: First, the offline training phase to train the system with video features and corresponding context information from the captioned video data and the an online query processing phase for executing a query expressed in natural language and retrieving the top videos (sentence-to-video) or a video as the query and retrieving top sentences describing the context of the input video, where the video context matches with the context of the sentences.

In the offline phase, low-level and semantic features are extracted for a large video repository and indexed so that the online phase is sufficiently efficient. The semantic features are predictions of semantic concept detectors, which takes low-level features as input and predicts whether a given concept exists in a video. Second, in the online phase, users can provide different types of queries to search for relevant videos. However, in some embodiments, operations from the offline and online phase may be combined or performed simultaneously in real time. Thus, in the process described below, steps from both phases are interleaved into a combined process.

During the online query processing phase, the user might provide a video or a sentence as an input, known as video-to-sentence, or a query expressed in natural language, known as sentence-to-video. In the case of the video-to-sentence, the features for the input video are extracted and embedded in a feature vector. This feature vector is passed to the trained model and the top sentences are retrieved, corresponding to the captions of the videos where feature similarities are high compared to the query video.

In some embodiments, a video is represented in the form of text, so a user can input a natural language query where textual descriptions, like the input query, can be retrieved. The sentence can be represented in the form of an encoded vector, where the distance in the vector space indicates the similarity between the two sentences. In other words, generated video captions may be fed to a pre-trained sentence encoding model. The retrieval pipeline is based on the Euclidean distance between the encoded input query vector and the encoded vectors of all videos in the database. The result is displayed as a set of top videos based on increasing Euclidean distance.

In another embodiment, the encoded vector is not converted into a caption. Rather, the encoded video information and a vector representing a text or video based query may be embedded into a common embedding space using a joint video-sentence embedding model.

Thus, at operation 200, the system receives the search query from a user. In some cases, the operations of this operation may refer to, or be performed by, a query component as described with reference to FIG. 13.

At operation 205, in the offline phase, the system identifies a set of video clips. In some cases, the operations of this operation may refer to, or be performed by, a video processing component as described with reference to FIG. 13.

At operation 210, the system selects a set of video frames from a video clip. In some cases, the operations of this operation may refer to, or be performed by, a video processing component as described with reference to FIG. 13.

At operation 215, the system embeds encoded video information from the video clip using the embedding model. In some cases, the operations of this operation may refer to, or be performed by, an embedding component as described with reference to FIG. 13.

At operation 220, the system embeds the search query using the embedding model. In some cases, the operations of this operation may refer to, or be performed by, an embedding component as described with reference to FIG. 13.

At operation 225, the system calculates a distance between the embedded encoded video information and the embedded search query. In some cases, the operations of this operation may refer to, or be performed by, a comparison component as described with reference to FIG. 13.

At operation 230, the system selects one or more of the video clips based on the calculated distance. In some cases, the operations of this operation may refer to, or be performed by, a comparison component as described with reference to FIG. 13.

At operation 235, the system presents the one or more of the video clips to the user in response to receiving the search query. In some cases, the operations of this operation may refer to, or be performed by, a display component as described with reference to FIG. 13.

Figure 3:
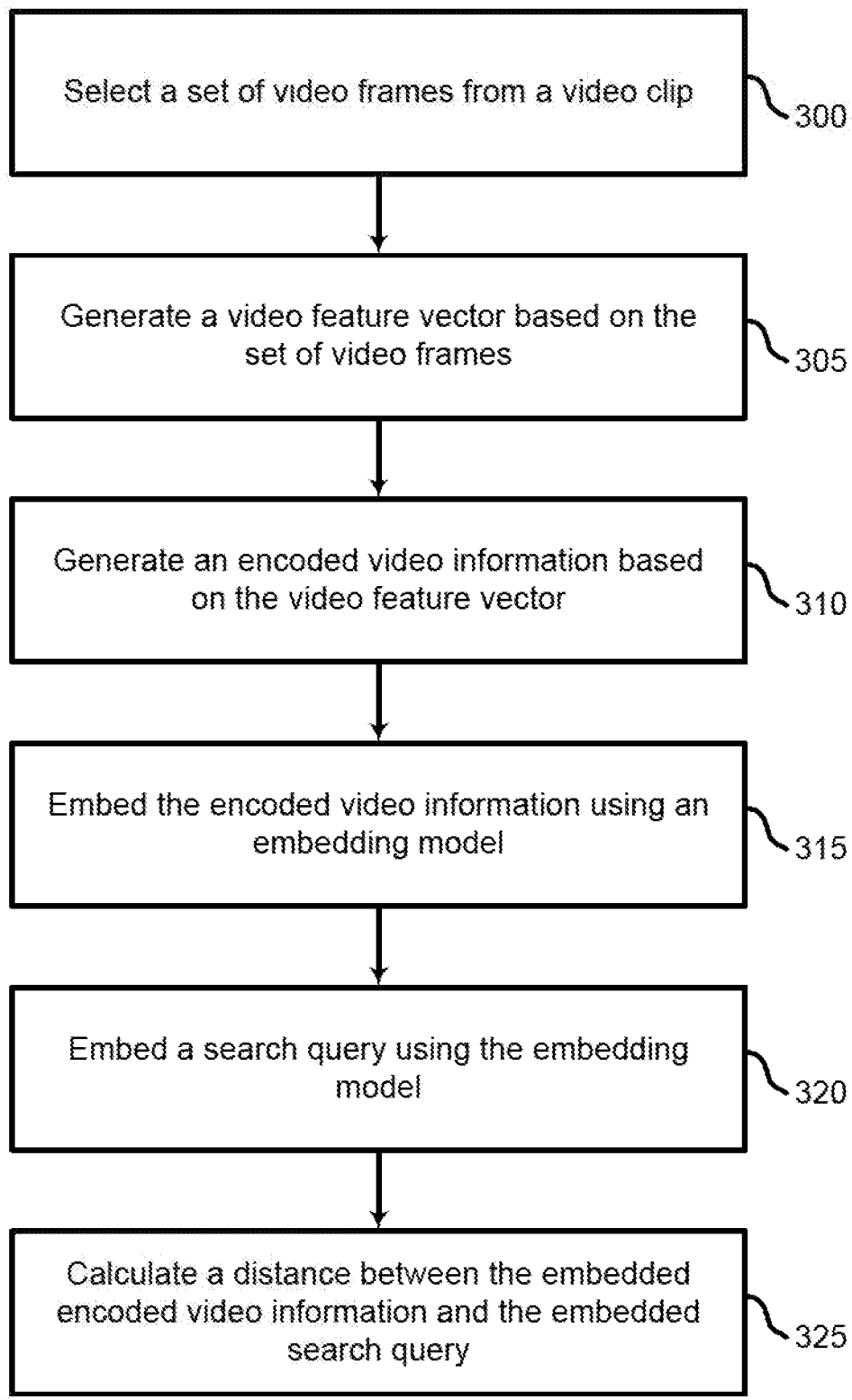
FIG. 3 shows an example of a process for calculating a distance between video information and a search query according to aspects of the present disclosure.

FIG. 3 shows an example of a process for calculating a distance between video information and a search query according to aspects of the present disclosure. In some examples, these operations may be performed by a video retrieval system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 300, the system selects a set of video frames from a video clip. In some cases, the operations of this operation may refer to, or be performed by, a video processing component as described with reference to FIG. 13. For example, the system may identify a predetermined number of video frames for the video clip, identify a plurality of video clips including the video clip, and resize each of the plurality of video frames according to a predetermined size. Further detail regarding the operations of step 300 is described with reference to FIGS. 4 and 5.

At operation 305, the system generates a video feature vector based on the set of video frames. In some cases, the operations of this operation may refer to, or be performed by, a video feature extraction component as described with reference to FIG. 13. For example, the system may input the plurality of video frames into a video feature extraction model. In some cases, the video feature vector is based on a temporal relationship between the video frames. Further detail regarding the operations of step 305 is described with reference to FIGS. 4 and 6.

At operation 310, the system generates encoded video information based on the video feature vector. In some cases, the operations of this operation may refer to, or be performed by, a feature encoder as described with reference to FIGS. 13-15. For example, the system may input the video feature vector into an LSTM encoder. Further detail regarding an embodiment of step 310 is described according to FIG. 7.

At operation 315, the system embeds the encoded video information using an embedding model. In some cases, the operations of this operation may refer to, or be performed by, an embedding component as described with reference to FIG. 13. In some cases, the encoded video information is converted into a text caption and then embedded using a sentence embedding model. In other examples, the encoded video information is directly embedded into a joint video-sentence embedding model. Further detail regarding an embodiment of steps 315 is described with reference to FIGS. 8-9 (the sentence embedding model) and 10-11 (the joint video-sentence embedding model).

At operation 320, the system embeds a search query using the embedding model. In some cases, the operations of this operation may refer to, or be performed by, an embedding component as described with reference to FIG. 13. As in operation 315, the embedding component may utilize either a sentence embedding model, or a joint video-sentence embedding model.

At operation 325, the system calculates a distance between the embedded encoded video information and the embedded search query. In some cases, the operations of this operation may refer to, or be performed by, a comparison component as described with reference to FIG. 13. For example, the distance may be calculated by taking the Euclidean distance between two vectors (i.e., the video vector and the query vector) in a common embedding space. Alternatively, cosine similarity or another suitable measure of separation between vectors may be used.

Figure 4:
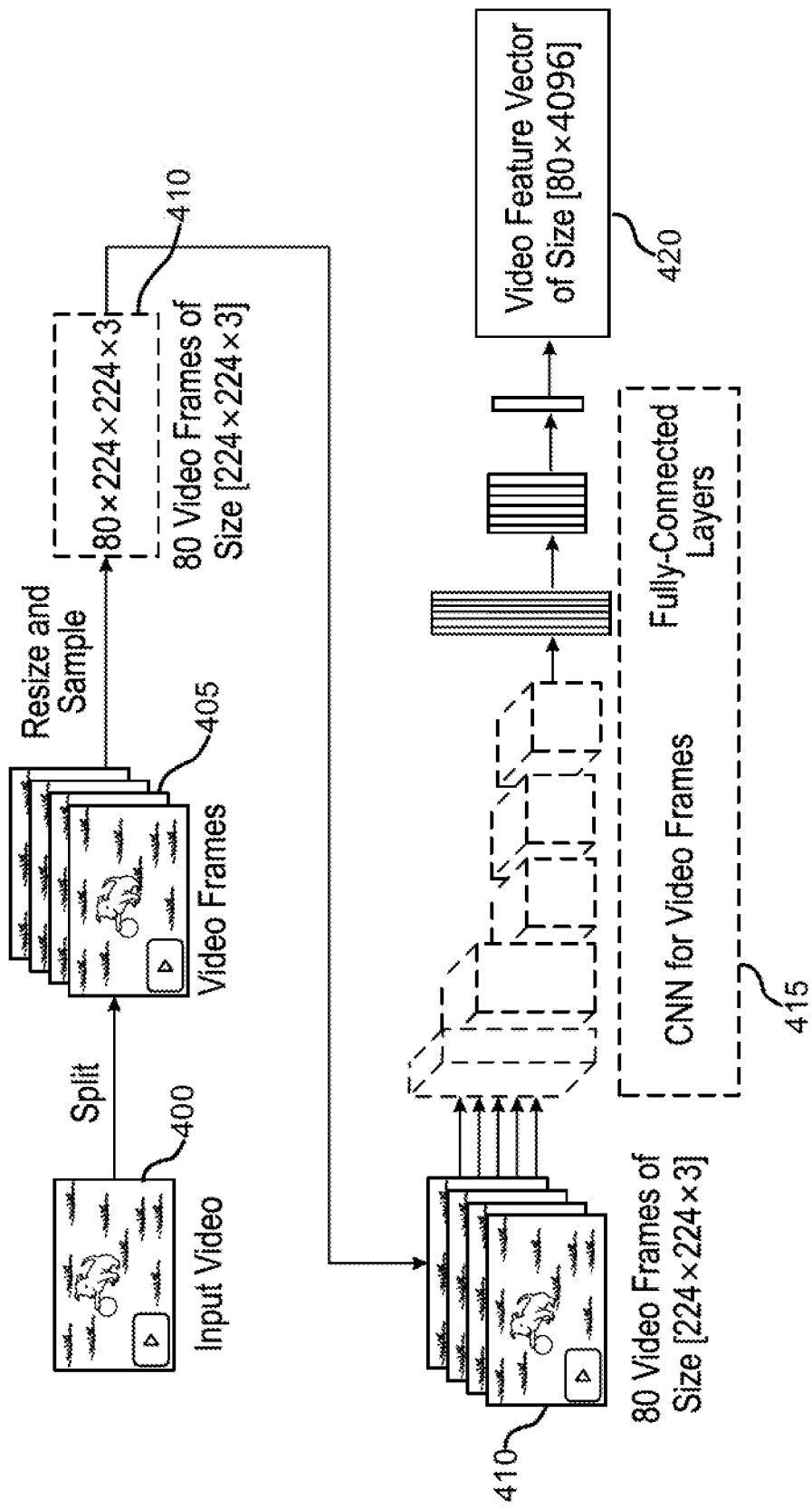
FIG. 4 shows an example of video preprocessing according to aspects of the present disclosure.
Figure 5:
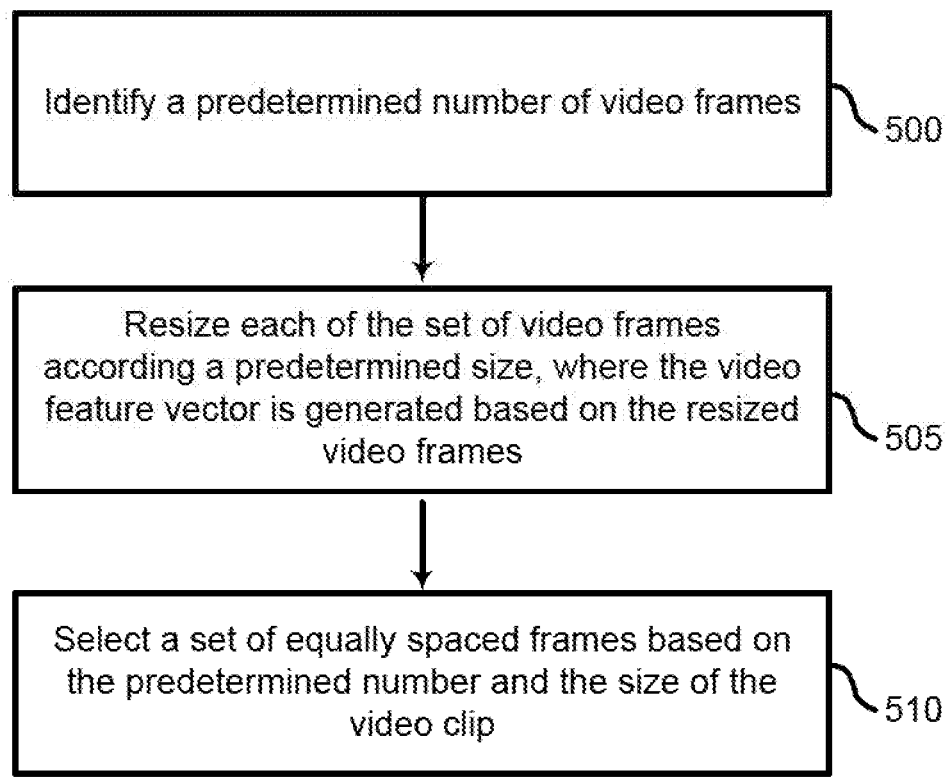
FIG. 5 shows an example of a process for selecting a plurality of video frames from a video clip according to aspects of the present disclosure.
Figure 6:
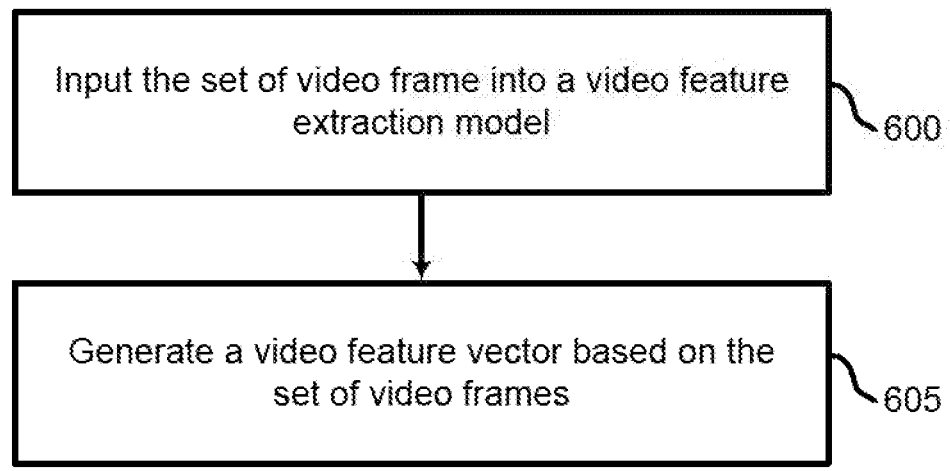
FIG. 6 shows an example of a process for generating a video feature vector based on a plurality of video frames according to aspects of the present disclosure.

Referring to FIGS. 4 through 6, a process for video pre-processing and video feature generation is described.

The preprocessing step takes video input and splits the input into frames. The frames are the images that constitute videos. These frames are then re-sized to be used as an input to pre-trained image recognition models.

The preprocessing step involves extracting video features from the input videos, and the text features to represent the video captions and the user queries. To extract video features, video input is split into a multitude of frames using embodiments of another disclosure. These frames are then re-sized to predetermined dimensions to be used as an input to pre-trained image recognition models. For example, 80 equally spaced frames are sampled to make the length of the feature vector uniform across multiple videos. Videos having less than 80 frames are padded with zero-filled frames. These frames are further encoded to a feature vector of size, for example, 4096 using the penultimate layer of a pre-trained convolution neural network model. After passing the set of 80 frames which implies input of size, a temporal sequence of feature vectors corresponding to the frame images is determined. A plurality of image-recognition model can be used to extract features from the video frames.

The general feature extraction can be described by considering $\{x_1, x_2, \ldots, x_n\}$ as the input comprising of video frames, and the output is also a sequence $\{y_1, y_2, \ldots, y_n\}$, which is described as, $y_i=f(x_i)$ where $f( )$ is any suitable image recognition model. The outputs generated am represented in a video feature vector of size [80, 4096], which is then used as an input to both the neural language model and sentence encoding model.

Following the preprocessing step, the set of frames contain the information used to generate the relevant text describing the frames. Thus, visual content of the video may be used to provide an automated method of describing the video. The frames are input to the neural image recognition model that can capture the features suggested for the neural language model to describe the video. The frames may be encoded to a high-dimensional feature vector (e.g. of size 4096) using the penultimate layer of a pre-trained conv-net model such as VGG16.

FIG. 4 shows an example of video pre-processing according to aspects of the present disclosure. The example shown includes video clip 400, video frames 405, resized frames 410, video feature extraction component 415, and video feature vector 420.

Video frames 405 are generated by selecting one or more still frames (e.g., 80 frames) from the video clip 400. In some cases, the frames 405 are evenly spaced still images from the video clip 400. Optionally, the video frames 405 may be scaled to a standard size to produce resized frames 410 (e.g., 224×224×3 pixels).

Then, video feature extraction component 415 may generate a video feature vector 420 based on the set of video frames 405. Thus, the video feature vector 420 is the output of the video feature extraction model. In some cases, the video feature vector 420 includes temporal information linking features to the temporal order of the frames. For example, an LSTM model architecture may be used to capture the temporal relationship among frames.

FIG. 5 shows an example of a process for selecting a plurality of video frames from a video clip according to aspects of the present disclosure. In some examples, these operations may be performed by a video retrieval system including a video processing component as described with reference to FIG. 13. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 500, the system identifies a predetermined number of video frames. At operation 505, the system resizes each of the sets of video frames according to a predetermined size, where the video feature vector is generated based on the resized video frames. At operation 510, the system selects a set of equally spaced frames based on the predetermined number and the size of the video clip. For example, if a video clip is 20 seconds long, and 40 frames are desired, then a still frame may be selected from the video clip every 0.5 seconds.

In the example described above with reference to FIG. 4, 80 video frames were selected, and resized to size 224×224×3. However, the present disclosure is not limited to these number. That is, a different number of frames may be selected, and each frame may be resized to a size other than that shown in FIG. 4.

FIG. 6 shows an example of a process for generating a video feature vector based on a plurality of video frames according to aspects of the present disclosure. In some examples, these operations may be performed by a video retrieval system including a video feature extraction component as described with reference to FIGS. 4 and 13. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 600, the system inputs the set of video frames into a video feature extraction model. At operation 605, the system generates a video feature vector based on the set of video frames. In some examples, the video feature extraction model includes a convolutional neural network (CNN) and one or more fully connected layers. For example, the video feature extraction model may include a VGG16 model, a ResNet model, or any other suitable feature extraction or classification, model. Video feature extraction component 415 may be an example of, or include aspects of, the corresponding element or elements described with reference to FIG. 13.

Referring to FIGS. 7-11, embodiments of a neural language model are described, the neural language model may include both an encoder and a decoder (in a sentence embedding model) or an encoder only (in a joint video-sentence embedding model).

The output from the feature extraction described above with reference to FIGS. 4-6 comprises the frame feature extraction part of the video retrieval system. The output is then used as input to the encoder of the neural language model. In some embodiments, the video retrieval system uses a variable length input, encoded in a latent vector representation, to produce word vectors.

The described systems and methods may project both videos and sentences into a common embedding space. In one embodiment, a two-branch neural network may be used, where the input video and the sentence are both converted into embedding vectors of the same size. A loss function may be used to train the embedding model such that similar sentences have vectors close to each other in the embedding space.

Regardless of whether the input query is a sentence or a video, the associated embedding vectors can be found using the sentence encoding model, and similarities can be defined by the Euclidean distance metric. For example, video queries may be converted to captions, which may be mapped into the embedding space using a sentence embedding model. Alternatively, encoded video information for a search query may be mapped directly into the embedding space without creating a video caption.

Figure 7:
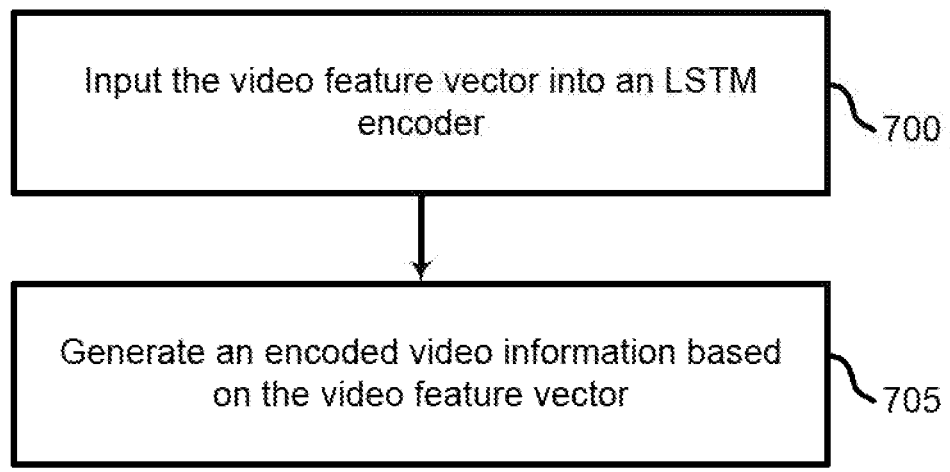
FIG. 7 shows an example of a process for generating an encoded video information based on a video feature vector according to aspects of the present disclosure.

FIG. 7 shows an example of a process for generating encoded video information based on a video feature vector according to aspects of the present disclosure. In some examples, these operations may be performed by a video retrieval system including a feature encoder as described with reference to FIGS. 13-15. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

The video retrieval process may involve encoding a video feature vector into a latent vector representation of encoded video information. In some cases, the encoded video information is decoded to produce a sequence of words which represents the caption for the video.

In one example, the encoder may be an unsupervised artificial neural network used to learn efficient data encoding. In some cases, an autoencoder may learn a representation (i.e., the encoded video information) by training the network to ignore signal noise. This may result in significant dimensionality reduction. The encoded video information may include temporal information based on the temporal information included in the video feature vector.

For example, the encoded video information may depend on the order of the video frames, thus capturing important information about the original video. For example, a frame depicting a man holding his chest and then a subsequent frame showing the man had fallen on the ground may be represented differently than if the frame showing the man on the ground appearing first.

A recurrent neural network (RNN)\ including a long short-term memory (LSTM) encoder may be used to capture this temporal information. RNNs have proven to be quite successful in dealing with vanishing gradient problem over the sequence during training. However, other types of encoder may also be used. For an input of $x_t$ representing the input vector at time t in the sequence of inputs, a LSTM unit calculates the hidden state $h_t$ and memory cell state $c_t$ which is an embedding of everything the cell has observed until time t.

This encoder-decoder may be represented as follows.

$$i_t = \sigma(W_{xi}x_t + W_{hi}h_{t-1} + b_i);  \quad (Eq. 1)$$

$$f_t = \sigma(W_{xf}x_t + W_{hf}h_{t-1} + b_f);  \quad (Eq. 2)$$

$$o_t = \sigma(W_{xo}x_t + W_{ho}h_{t-1} + b_o);  \quad (Eq. 3)$$

$$g_t = \sigma(W_{xg}x_t + W_{hg}h_{t-1} + b_g);  \quad (Eq. 4)$$

$$c_t = f_t \odot c_{t-1} + i_t \odot g_t;  \quad (Eq. 5)$$

$$h_t = o_t \odot \tanh(c_t);  \quad (Eq. 6)$$

where the left-hand side variables defined in the equations above are maintained by internal states of LSTM. The $i_t$ and $f_t$ are input and forget gates respectively, and $g_t$ represents vector of new candidate values. $\sigma$ and tanh are non-linear activation functions; ⊙ is the element wise multiplication operator; $W_{ij}$ are weight parameters, and $b_j$ are biases to be learned.

During encoding, given an input sequence of $X=\{x_1, x_2, \ldots, x_n\}$, LSTM computes sequence of hidden states $\{h_1, h_2, \ldots, h_n\}$. The final state $h_n$ is given as an input to the decoder which defines a distribution over the output sequence $Y=\{y_1, y_2, \ldots, y_n\}$ given the input sequence X, denoted as p(Y|X). This is given by the following equation:

$$p(y_1, \ldots, y_m | x_1, \ldots, x_n) = \Pi_{t=1}^{m} p(y_t | h_{n+t-1}, y_{t-1}), \quad \text{(Eq.7)}$$

where the distribution of $p(y_t | h_{n+t})$ is expressed by a softmax function over multiple words in the vocabulary, as follows:

$$p(y | z_t) = \frac{\exp(W_y z_t)}{\sum_{y' \in V} \exp(W_{y'} z_t)}, \quad \text{(Eq. 8)}$$

where $z_t$ is the output from the LSTM units in the decoder RNN and y is the emitted word.

At operation 700, the system inputs the video feature vector into an encoder. At operation 705, the system generates encoded video information based on the video feature vector.

Figure 8:
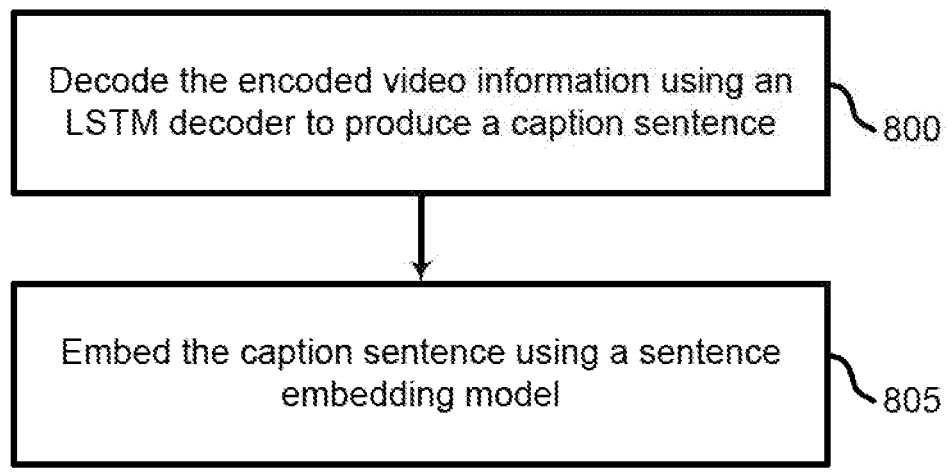
FIG. 8 shows an example of a process for embedding encoded video information using a sentence embedding model according to aspects of the present disclosure.
Figure 9:
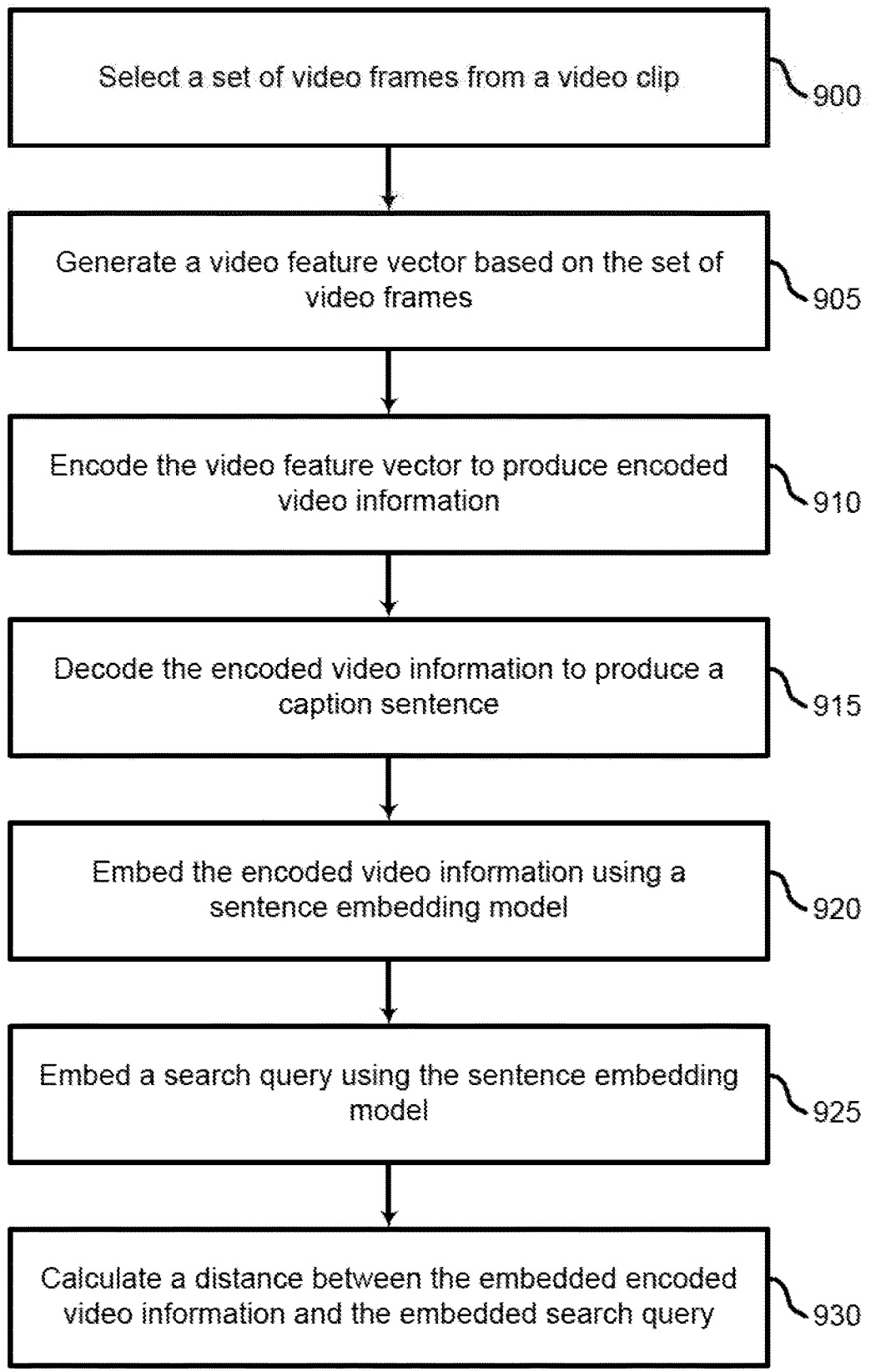
FIG. 9 shows an example of a process for content-based video retrieval using a sentence embedding model according to aspects of the present disclosure.

Referring now to FIGS. 8 and 9, an overview of an embodiment is described in which a caption is produced for each video clip, and the caption is embedded into a vector space using a sentence embedding model (i.e., Skip-Thoughts model, a Universal Sentence Encoding model). A decoder may be used in conjunction with the encoder described above to generate the caption.

In some cases, an optimizer is used with the RNN to train the network. In this way, textual descriptions about multiple videos are obtained, which is then passed to the further stage in the pipeline, which is used in the inference time to retrieve videos. The sentence embedding model defined earlier may then be used to embed the sentences generated from videos.

The sentence embeddings may be stored and used at the time of video retrieval. The retrieval of relevant videos may be based on the Euclidean distance between the sentence embedding of input sentence query vector and the encoded vectors of multiple video captions in the database. The result may be displayed as a set of top videos based on increasing Euclidean distance.

For example, embeddings related to sleeping cat videos may be close to each other in the embedding space, so when a user searches for "a sleeping cat", the query may be embedded into the common embedding space near the sleeping cat videos. Thus, a number of the videos whose embedding falls closest to the query may be returned as the top results.

In some embodiments, the neural language model is comprised of Long Short-Term Memory (LSTM) units, which are useful in dealing with gradient vanishing problem over the sequence during training. An LSTM is a unit in recurrent neural network. For an input vector at a time in the sequence of inputs, a LSTM unit calculates the hidden state and memory cell state which is an embedding of everything the cell has observed until a set time. During encoding, LSTM computes the sequence of hidden states.

This is a sequence-to-sequence model whose input and output both comprises of a sequence using an encoder to encode input sequences and a decoder which defines a distribution over the output sequence given an input sequence. The distribution is given by a softmax function over multiple words in the vocabulary given by the equation.

FIG. 8 shows an example of a process for embedding encoded video information using a sentence embedding model according to aspects of the present disclosure. In some examples, these operations may be performed by a video retrieval system including a feature decoder as described with reference to FIGS. 13 and 14. Additionally or alternatively, the processes may be performed using special-purpose hardware. Generally, these operations may be performed according to the methods and processes described in accordance with aspects of the present disclosure. For example, the operations may be composed of various sub-steps or may be performed in conjunction with other operations described herein.

At operation 800, the system decodes the encoded video information using decoder to produce a caption sentence. In some cases, an LSTM decoder may be used to capture the temporal information in the encoded video information to produce a sentence.

At operation 805, the system embeds the caption sentence using a sentence embedding model. In one example, the sentence embedding model may include a Skip-Thoughts model, a Universal Sentence Encoding model, or any other suitable model for representing a sentence in a vector space that encodes the relationships between words.

FIG. 9 shows an example of a process for content-based video retrieval using a sentence embedding model according to aspects of the present disclosure. In some examples, these operations may be performed by a video retrieval system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps or may be performed in conjunction with other operations described herein.

At operation 900, the system selects a set of video frames from a video clip. In some cases, the operations of this operation may refer to, or be performed by, a video processing component as described with reference to FIG. 13.

At operation 905, the system generates a video feature vector based on the set of video frames. In some cases, the operations of this operation may refer to, or be performed by, a video feature extraction component as described with reference to FIG. 13.

At operation 910, the system encodes the video feature vector to produce encoded video information. In some cases, the operations of this operation may refer to, or be performed by, a feature encoder as described with reference to FIGS. 13-15.

At operation 915, the system decodes the encoded video information to produce a caption sentence. In some cases, the operations of this operation may refer to, or be performed by, a feature decoder as described with reference to FIGS. 13 and 14.

At operation 920, the system embeds the caption sentence using a sentence embedding model. In some cases, the operations of this operation may refer to, or be performed by, an embedding component as described with reference to FIG. 13.

At operation 925, the system embeds a search query using the sentence embedding model. In some cases, the operations of this operation may refer to, or be performed by, an embedding component as described with reference to FIG. 13.

At operation 930, the system calculates a distance between the embedded caption sentence and the embedded search query. In some cases, the operations of this operation may refer to, or be performed by, a comparison component as described with reference to FIG. 13.

Figure 10:
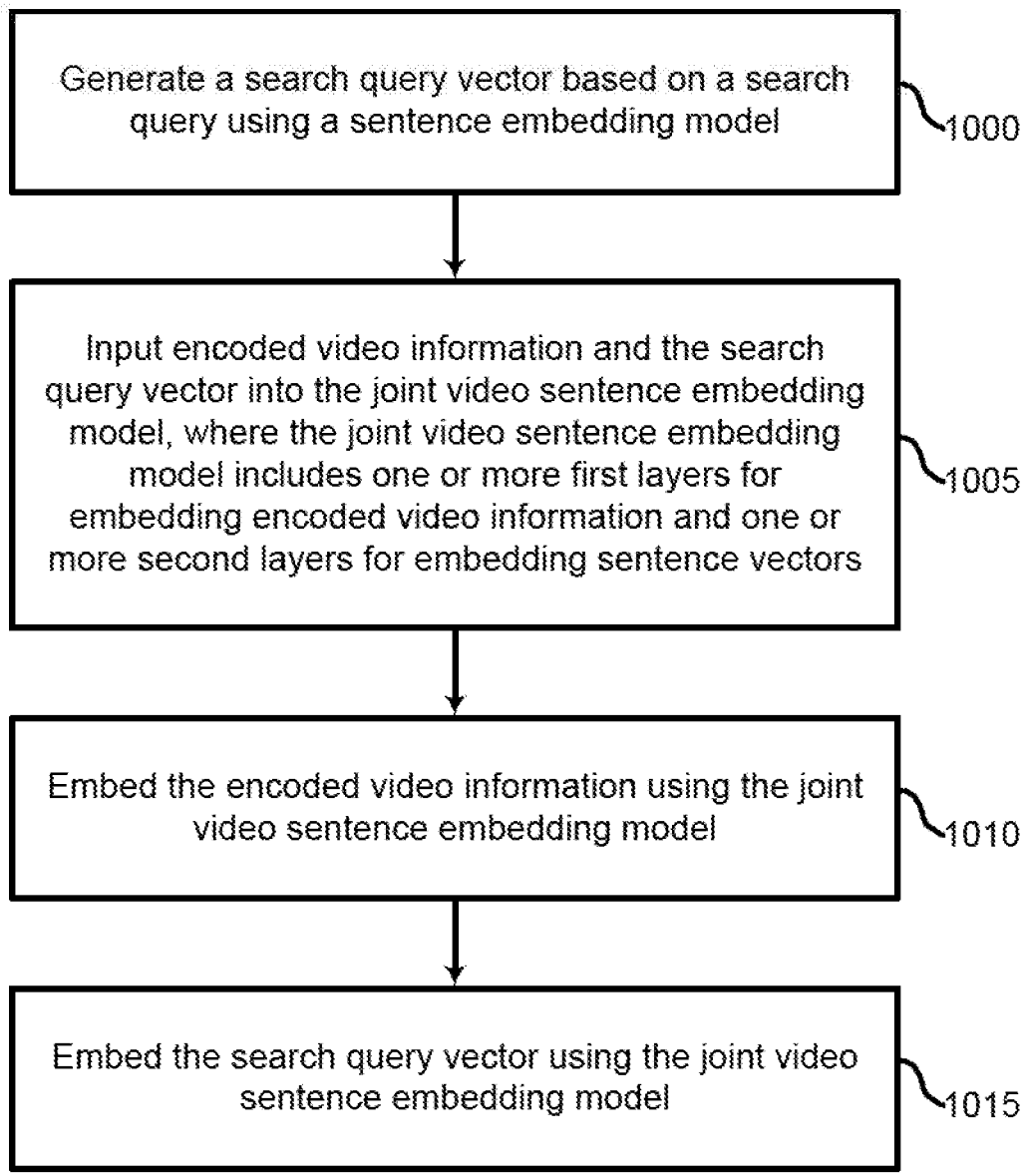
FIG. 10 shows an example of a process for embedding encoded video information using a joint video-sentence embedding model according to aspects of the present disclosure.
Figure 11:
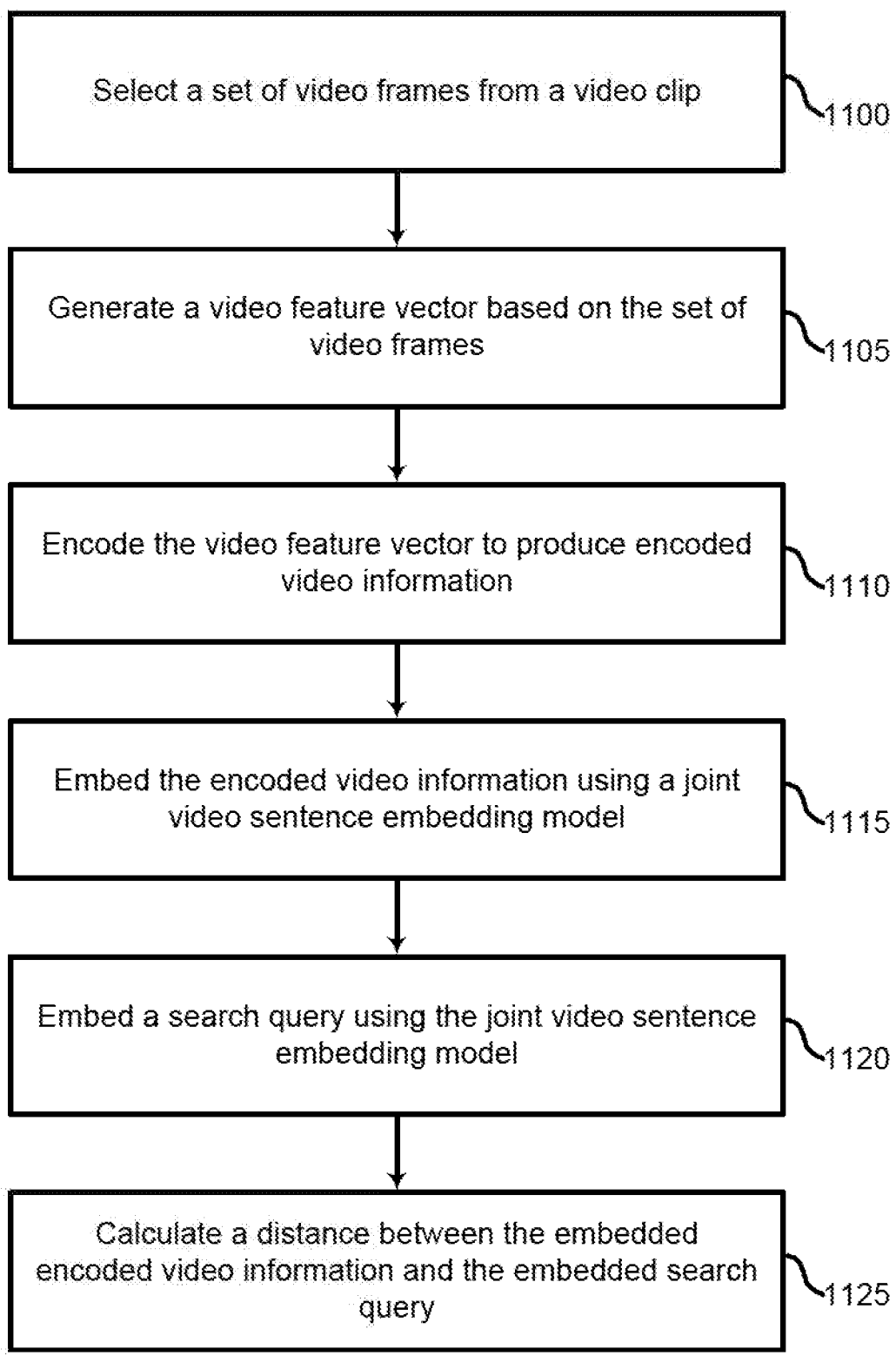
FIG. 11 shows an example of a process for content-based video retrieval using a joint video-sentence embedding model according to aspects of the present disclosure.

Referring now to FIGS. 10 and 11, an embodiment is described in which a encoded video information and a search query are embedded into a common space using a joint video-sentence embedding model. In other words, in this embodiment, a caption is not created for the video clip.

FIG. 10 shows an example of a process for embedding encoded video information using a joint video-sentence embedding model according to aspects of the present disclosure. In some examples, these operations may be performed by a video retrieval system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 1000, the system generates a search query vector based on a search query using a sentence embedding model. In some cases, the operations of this operation may refer to, or be performed by, an embedding component as described with reference to FIG. 13.

At operation 1005, the system inputs encoded video information and the search query vector into the joint video-sentence embedding model, where the joint video-sentence embedding model includes one or more first layers for embedding encoded video information and one or more second layers for embedding sentence vectors. In some cases, the operations of this operation may refer to, or be performed by, an embedding component as described with reference to FIG. 13.

At operation 1010, the system embeds the encoded video information using the joint video-sentence embedding model. In some cases, the operations of this operation may refer to, or be performed by, an embedding component as described with reference to FIG. 13.

At operation 1015, the system embeds the search query vector using the joint video-sentence embedding model. In some cases, the operations of this operation may refer to, or be performed by, an embedding component as described with reference to FIG. 13.

FIG. 11 shows an example of a process for content-based video retrieval using a joint video-sentence embedding model according to aspects of the present disclosure. In some examples, these operations may be performed by a video retrieval system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps or may be performed in conjunction with other operations described herein.

At operation 1100, the system selects a set of video frames from a video clip. In some cases, the operations of this operation may refer to, or be performed by, a video processing component as described with reference to FIG. 13.

At operation 1105, the system generates a video feature vector based on the set of video frames. In some cases, the operations of this operation may refer to, or be performed by, a video feature extraction component as described with reference to FIG. 13.

At operation 1110, the system encodes the video feature vector to produce encoded video information. In some cases, the operations of this operation may refer to, or be performed by, a feature encoder as described with reference to FGs. 13-15.

At operation 1115, the system embeds the encoded video information using a joint video-sentence embedding model. In some cases, the operations of this operation may refer to, or be performed by, an embedding component as described with reference to FIG. 13.

At operation 1120, the system embeds a search query using the joint video-sentence embedding model. In some cases, the operations of this operation may refer to, or be performed by, an embedding component as described with reference to FIG. 13.

At operation 1125, the system calculates a distance between the embedded encoded video information and the embedded search query. In some cases, the operations of this operation may refer to, or be performed by, a comparison component as described with reference to FIG. 13.

Figure 12:
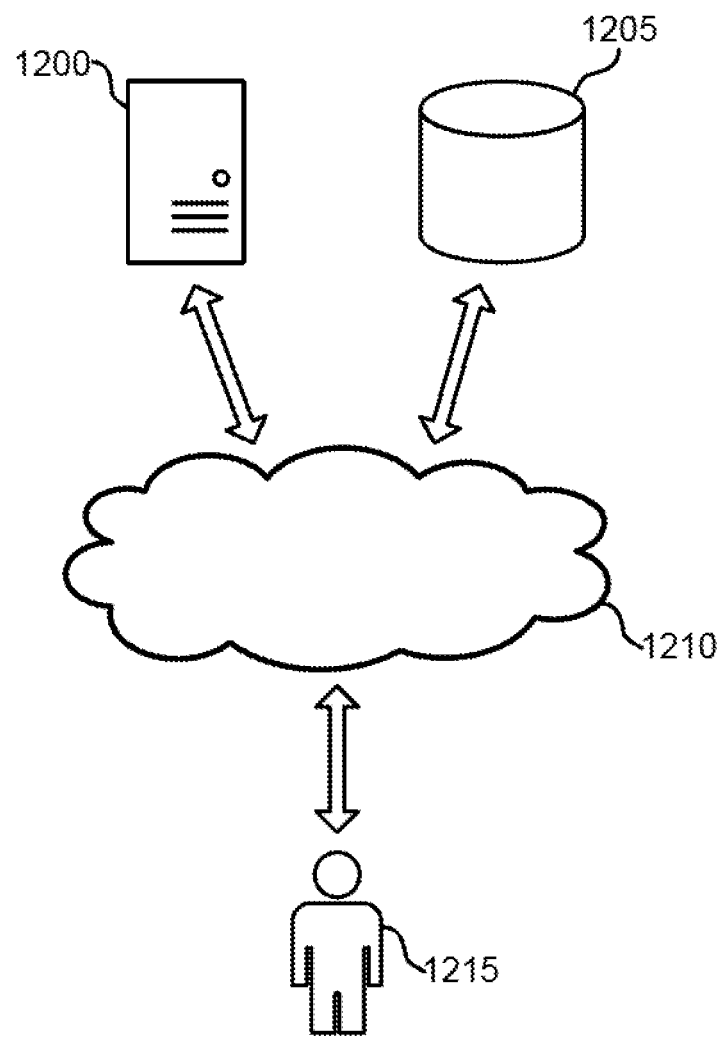
FIG. 12 shows an example of a system for content-based video retrieval according to aspects of the present disclosure.

FIG. 12 shows an example of a video retrieval system for content-based video retrieval according to aspects of the present disclosure. The example shown includes video retrieval server 1200, video database 1205, network 1210, and user 1215. Video retrieval server 1200 receives a search query from user 1215 via network 1210, identifies one or more videos using the methods described herein, and then returns a set of videos to the user 1215 in response to the query.

In some cases, video retrieval server 1200 retrieves video clips from video database 1205, and embeds information from the video clips in a common space with text from the search query. The distance between the search query and each video clip may be the basis for selecting videos to provide user 1215. In some cases, the videos are embedded in the common space prior to receiving the search query.

Figure 13:
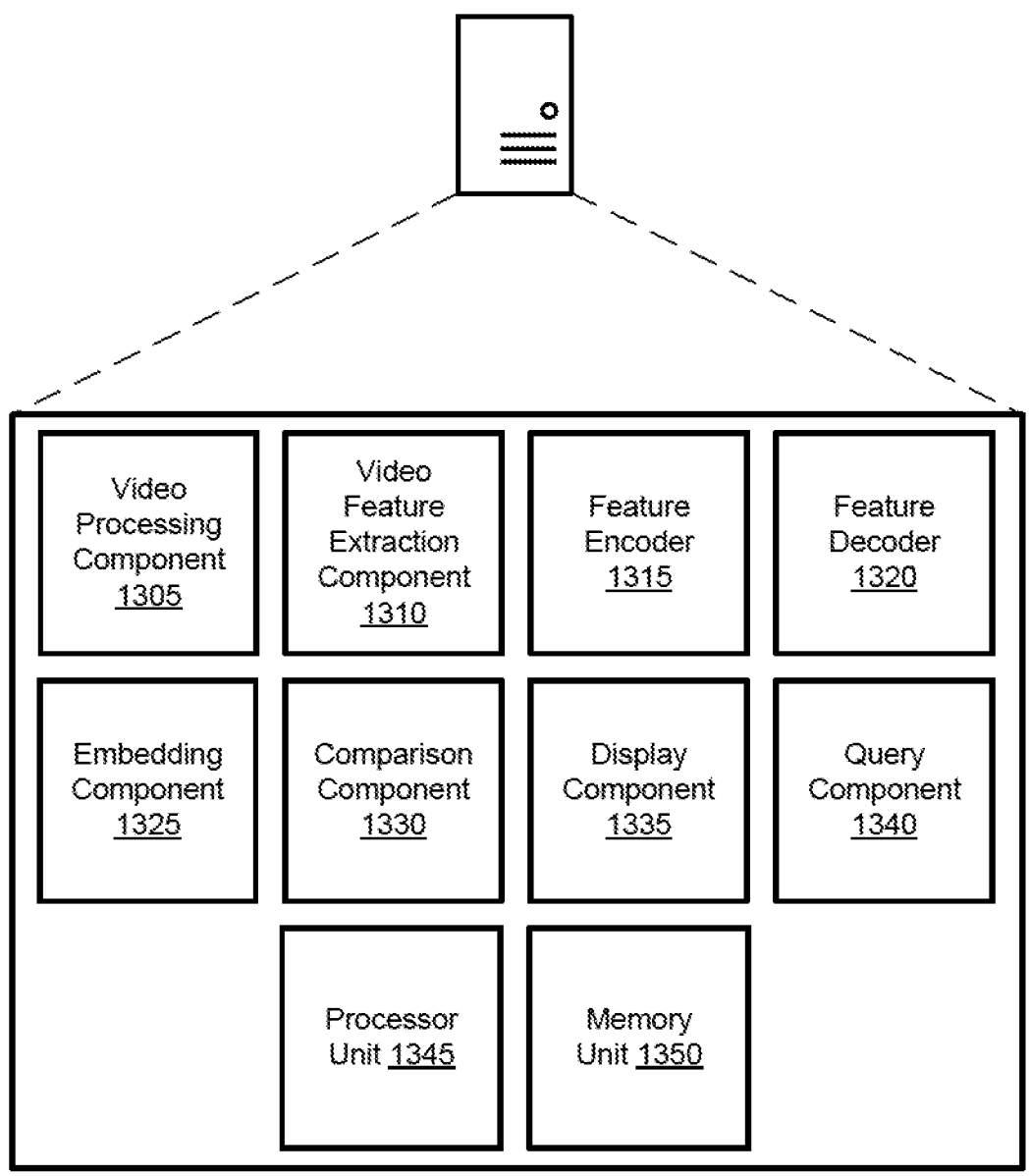
FIG. 13 shows an example of a video retrieval server according to aspects of the present disclosure.

FIG. 13 shows an example of a video retrieval server 1300 according to aspects of the present disclosure. Video retrieval server 1300 may be an example of, or include aspects of, the corresponding element or elements described with reference to FIG. 12.

Video retrieval server 1300 may include video processing component 1305, video feature extraction component 1310, feature encoder 1315, feature decoder 1320, embedding component 1325, comparison component 1330, display component 1335, query component 1340, processor unit 1345, and memory unit 1350.

Video processing component 1305 may identify a set of video clips including the video clip, and select a set of video frames from each video clip. Video processing component 1305 may identify a predetermined number of video frames for the video clip, where the set of video frames includes equally spaced frames selected based on the predetermined number and a size of the video clip. Video processing component 1305 may also resize each of the sets of video frames according to a predetermined size.

Video feature extraction component 1310 may generate a video feature vector based on the set of video frames. Video feature extraction component 1310 may also input the set of video frames into a video feature extraction model, where the video feature vector includes an output of the video feature extraction model. In some examples, the video feature extraction model includes a convolutional neural network (CNN) and one or more fully connected layers.

Feature encoder 1315 may generate encoded video information based on the video feature vector. For example, feature encoder 1315 may input the video feature vector into an LSTM encoder, where the encoded video information includes an output of the LSTM encoder. In some examples, the LSTM encoder includes a bi-directional LSTM encoder as described below with reference to FIGS. 14 and 15. Feature encoder 1315 may be an example of, or include aspects of, the corresponding element or elements described with reference to FIGS. 14 and 15.

Feature decoder 1320 may decode the encoded video information to produce a caption sentence. For example, feature decoder 1320 may decode the encoded video information using an LSTM decoder to produce a caption sentence, where embedding the encoded video information includes embedding the caption sentence. In some examples, the embedding model includes a sentence embedding model. In embodiments that use a joint video-sentence embedding model, the video retrieval server 1300 may not include a feature decoder 1320. That is, the output of the feature encoder 1315 may be embedded directly into a common space along with a vector representing a search query sentence.

In some examples, the encoded video information is decoded using a bi-directional LSTM encoder. In some examples, Feature decoder 1320 may generate a one or more word vectors based on the encoded video information, and one or more probability vectors by applying a softmax function to the first word vector. Feature decoder 1320 may identify words based on the caption sentence based on the first probability vectors, and then identify subsequent words of the caption sentence based on the previous words. Feature decoder 1320 may be an example of, or include aspects of, the corresponding element or elements described with reference to FIG. 14.

Embedding component 1325 may embed the encoded video information using an embedding model. Embedding component 1325 may also embed a search query using the embedding model. Embedding component 1325 may also generate a search query vector based on the search query using the sentence embedding model. In some embodiments, sentences and videos are embedded using a sentence embedding model. In other embodiments, sentences and videos are embedded using a joint video-sentence embedding model (i.e., when the encoded video information is not used to generate a caption).

In embodiments based on the joint video-sentence embedding model, embedding component 1325 may input the encoded video information and the search query vector directly into the embedding model, and the embedding model may include one or more first layers for embedding encoded video information and one or more second layers for embedding sentence vectors.

In embodiments based on the joint video-sentence embedding model, embedding component 1325 may generate a search query vector based on the search query using a sentence embedding model, where the search query is embedded based on the search query vector. Embedding component 1325 may then apply a first unit weight matrix, a first non-linear rectified linear activation unit and a second unit weight matrix to the encoded video information. Embedding component 1325 may apply a third unit weight matrix, a second non-linear rectified linear activation unit, and a fourth unit weight matrix to the search query vector. Embedding component 1325 may also normalize the encoded video information and the search query vector. In some examples, the encoded video information has a different number of dimensions from the search query vector.

Comparison component 1330 may calculate a distance between the embedded encoded video information and the embedded search query. Comparison component 1330 may also select one or more of the sets of video clips based on the calculated distance.

Display component 1335 may present the one or more of the set of video clips to the user in response to receiving the search query. Query component 1340 may receive the search query from a user.

A processor unit 1345 may include an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special-purpose components for modem processing, baseband processing, digital signal processing, or transmission processing. In some examples, the processor may comprise a system-on-a-chip.

A memory unit 1350 may store information for various programs and applications on a computing device. For example, the storage may include data for running an operating system. The memory may include both volatile memory and non-volatile memory. Volatile memory may be random access memory (RAM), and non-volatile memory may include read-only memory (ROM), flash memory, electrically erasable programmable read-only memory (EEPROM), digital tape, a hard disk drive (HDD), and a solid-state drive (SSD). Memory may include any combination of readable and/or writable volatile memories and/or non-volatile memories, along with other possible storage devices.

In some examples, one or more of the components described herein may be implemented using an artificial neural network (ANN). An ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted. During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer, and the last layer may be known as the output layer. In some cases, signals may traverse certain layers multiple times.

A convolutional neural network (CNN) is a class of neural network that is commonly used in computer vision or image classification systems. For example, the video feature extraction component 1310 may include a CNN. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Figure 14:
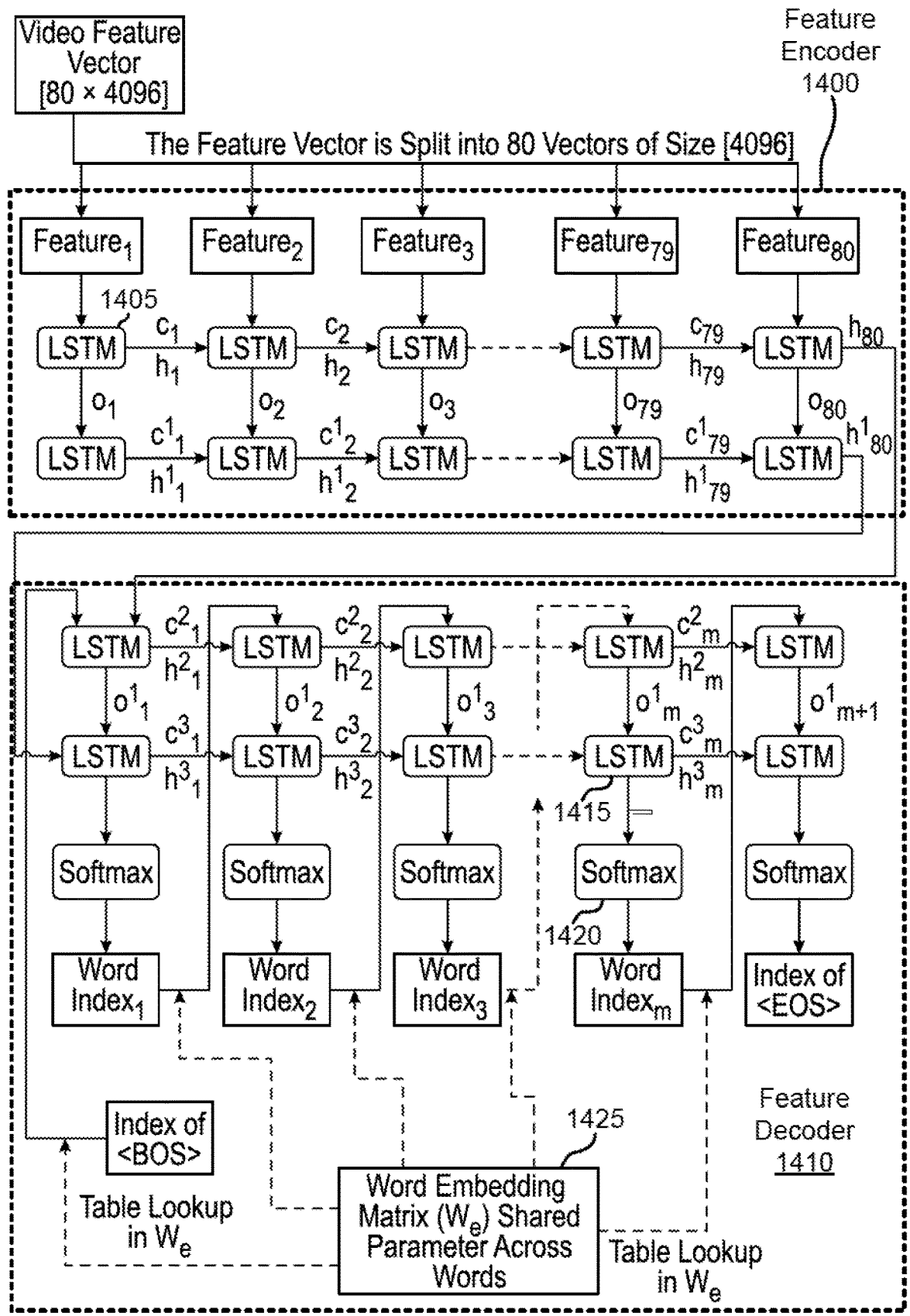
FIG. 14 shows an example of a feature encoder and a feature decoder according to aspects of the present disclosure.

FIG. 14 shows an example of a feature encoder 1400 and a feature decoder 1410 according to aspects of the present disclosure. Specifically, FIG. 14 shows an example of an embodiment in which a video feature vector is encoded, and then decoded to create a video caption.

The example shown includes feature encoder 1400 and feature decoder 1410. Feature encoder 1400 may be an example of, or include aspects of, the corresponding element or elements described with reference to FIGS. 13 and 15.

Feature decoder 1410 may be an example of, or include aspects of, the corresponding element or elements described with reference to FIG. 13. Feature encoder 1400 may include a plurality of LSTMs 1405, which may be arranged in a bi-directional formation.

As illustrated in FIG. 14, the feature encoder 1400 may be a bi-directional LSTM which allows the capture of context of the network in the past and the future at a time in the sequence. The input to feature encoder 1400 starts with the beginning of sentence <BOS> token which indicates the beginning of the sequence and the output of the LSTM 1405 is fed to the current unit to produce the next word and recursively the network is unfolded to obtain the output until the end of sentence <EOS> is produced which indicates the end of sequence and the network stops unfolding at the moment. The output words are then compared with actual annotated data and root mean square (RMS) error is optimized during training. In this way, textual description about multiple videos are obtained and the textual description is then passed to the second stage in the pipeline which is used in the inference time to retrieve videos.

Feature decoder 1410 may include LSTMs 1405, softmax units 1415, and word embedding matrix 1420. The LSTMs in feature decoder 1410 may be arranged in a bi-directional formation. Each softmax unit 1415 may provide a word index for use in subsequent LSTMs 1405.

The input to feature decoder 1410 starts with (BOS) token which indicates the beginning of the sequence, and the output of the LSTM unit is fed to the current unit to produce the next word. The network is unfolded recursively to obtain the output until (EOS) is produced, which indicates the end of sequence; the network stops unfolding at this moment. The input word is converted into a word embedding vector by performing a lookup on a word embedding matrix $W_e$. The output words are then compared with actual annotated data, and cross-entropy loss is calculated.

Figure 15:
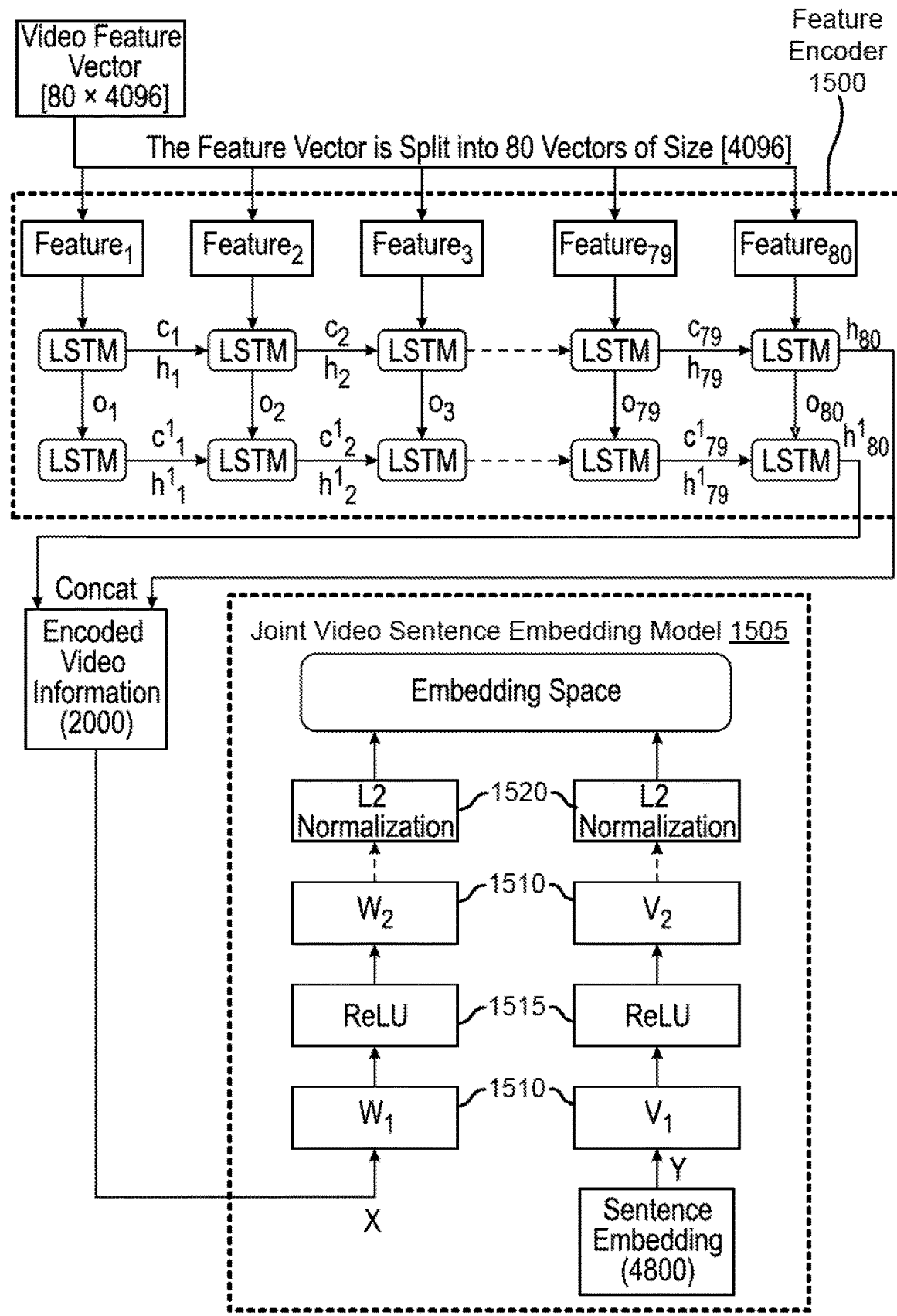
FIG. 15 shows an example of a joint video-sentence embedding model according to aspects of the present disclosure.

FIG. 15 shows an example of a joint video-sentence embedding model 1505 according to aspects of the present disclosure. Thus, FIG. 15 shows an example that does not include a feature decoder, and does not create a video caption. The example shown includes feature encoder 1500 and joint video-sentence embedding model 1505. Feature encoder 1500 may be an example of, or include aspects of, the corresponding element or elements described with reference to FIGS. 13 and 14.

A significant amount of information may be lost if video features are mapped to sentences (i.e., captions). Thus FIG. 15 describes an embodiment in which video vectors are used to generate encoded video information, but the encoded video information is not decoded using the decoder described with reference to FIG. 14.

A sentence feature vector is generated by using a sentence encoding model as described in the preprocessing step. X and Y in the figure denote the feature vector representations of videos and sentences, respectively. The joint video-sentence embedding model 1505 enables the mapping of video and sentence vectors to joint embedding space of common dimension.

A Euclidean distance between the video and sentence vectors in the embedding space is used as a similarity metric and is denoted by d(x,y). A non-linear embedding using a deep neural network framework can be learned. The joint video-sentence embedding model 1505 has two branches as shown in the figure, each consisting of fully connected layers with weight matrices $W_l$ and $V_l$, separated by non-linear rectified linear (ReLU) activation units. Batch normalization is then applied before the last linear layer. Note that ReLU is not applied after the last layer. The embeddings of videos and sentences are further normalized using L2 norm. Satisfactory results are received when two embedding layers per branch are kept.

The joint video-sentence embedding model 1505 may be trained using stochastic gradient descent (SGD) with a margin-based loss that encodes both bi-directional ranking constraints and neighborhood-preserving constraints within each modality. Given a visual input $x_i$ (a video embedding), let $Y_i^+$ and $Y_i^-$ denote its sets of matching (positive) and non-matching (negative) text samples, respectively. If $y_j$ and $y_k$ are positive and negative samples for $x_i$, it is desirable that the distance between $x_i$ and $y_j$ to be smaller than the distance between $x_i$ and $y_k$, with a margin of m. This leads to the following triplet-wise constraint:

$$d(x_i, y_j) + m < d(x_i, y_k); \quad \text{(Eq. 9)}$$

$$\forall y_j \in Y_i^+, \forall y_k \in Y_i^- \quad \text{(Eq. 10)}$$

Given a text input $y_{i'}$ (a sentence embedding), analogous constraints are in the opposite direction:

$$d(x_i, y_j) + m < d(x_i, y_k); \quad \text{(Eq. 11)}$$

$$\forall y_j \in X_{i'}^+, \forall x_k \in X_{i'}^- \quad \text{(Eq. 12)}$$

where $X_{i'}^+$ and $X_{i'}^-$ denote the sets of matched (positive) and nonmatched (negative) video embedding for $y_{i'}$. The margin-based loss function using the ranking constraints defined above is given as follows.

$$L(X, Y) = \lambda_1 \sum_{i,j,k} [m + d(x_i, y_j) - d(x_i, y_k)] + \quad \text{(Eq. 13)}$$

$$\lambda_2 \sum_{i',j',k'} [m + d(x_{j'}, y_{i'}) - d(x_{k'}, y_{i'})]$$

The loss function is a summation over a plurality of triplets as defined in the bi-directional ranking constraints.

The margin can be defined as m=0.05. Constants $\lambda_1$ and $\lambda_2$ define the strength of loss in each direction.

For each positive video-text pair (x,y) in a mini-batch, sampling triplets (x, y, y') are kept such that (x,y') is a negative pair and (y, x, x') such that (x',y) is a negative pair. Neighborhood constraints are introduced. For example, inside sentence modality is introduced when there is not enough information to determine if two videos are similar. In the sentence modality, text pairs that are similar are known because the text pairs correspond to the same video example, i.e. multiple sentences describing a video and hence have the pairs of sentences that are semantically like each other. Let N ($y_i'$) denote the neighborhood of $y_i'$, which is the set of sentence embeddings describing the same video example.

Neighborhood constraints enforce a margin m between N ($y_i'$) and any sentence embedding outside of neighborhood, which is given as follows.

$$d(y_i, y_j) + m < d(y_i, y_k),$$ (Eq. 14)

$$\forall y_j \in N(y_i), \forall y_k \notin N(y_i)$$ (Eq. 15)

After adding the neighborhood constraints to the bi-directional ranking loss, the total loss function looks as follows:

$$L_{st}(X,Y) + \lambda_2 \Sigma_{i',j',k'}[m + d(x_j, y_i) - d(x_k, y_i)]_+ + \lambda_3 \Sigma_{i',j',k'}[m + d(y_i, y_j) - d(y_i, y_k)]_+$$ (Eq. 16)

The training model may minimize the loss function as discussed above. The triplets considered in the loss are defined in the ranking and neighborhood constraints, as mentioned earlier. The neighborhood constraint indirectly suggests that the mini-batch should contain at least two sentences that describes the same video. To ensure this, new triplets (x, $y_1$, $y_1'$) and (x, $y_2$, $y_2'$) are added where $y_1$ and $y_2$ are two different sentence describing the video x (positive matches).

Thus, joint video-sentence embedding model 1505 may include fully connected layers 1510, rectified linear units (ReLUs) 1515, and normalization units 1520. Specifically, the joint video-sentence embedding model 1505 may include two parallel processing paths (one for encoded video information and one for sentence vectors). The encoded video information and a sentence vector are each processed, separately, by a first fully connected layer 1510 (i.e., a first unit weight matrix), a ReLU 151, and a second fully connected layer 1510 (i.e., a second unit weight matrix) before being normalized and embedded into a common embedding space. In some cases the common embedding space is conceptual. That is, the processing represents comparable information with similar output vectors.

Accordingly, the present disclosure includes the following embodiments.

A method, apparatus and non-transitory computer-readable medium storing code for content-based video retrieval is described. Embodiments may include selecting a plurality of video frames from a video clip, generating a video feature vector based on the plurality of video frames, generating an encoded video information based on the video feature vector, embedding the encoded video information using an embedding model, embedding a search query using the embedding model, and calculating a distance between the embedded encoded video information and the embedded search query.

Some examples of the method, apparatus, and non-transitory computer-readable medium described above may further include receiving the search query from a user. Some examples may further include identifying a plurality of video clips, including the video clip. Some examples may further include selecting one or more of the plurality of video clips based at least in part on the calculated distance. Some examples may further include presenting the one or more of the plurality of video clips to the user in response to receiving the search query.

Some examples of the method, apparatus, and non-transitory computer-readable medium described above may further include identifying a predetermined number of video frames for the video clip, wherein the plurality of video frames comprise equally spaced frames selected based on the predetermined number and a size of the video clip. Some examples of the method, apparatus, and non-transitory computer-readable medium described above may further include resizing each of the plurality of video frames according to a predetermined size, wherein the video feature vector is generated based on the resized video frames.

Some examples of the method, apparatus, and non-transitory computer-readable medium described above may further include inputting the plurality of video frames into a video feature extraction model, wherein the video feature vector comprises an output of the video feature extraction model. In some examples, the video feature extraction model comprises a convolutional neural network (CNN) and one or more fully connected layers.

Some examples of the method, apparatus, and non-transitory computer-readable medium described above may further include inputting the video feature vector into a long short-term memory (LSTM) encoder, wherein the encoded video information comprises an output of the LSTM encoder. In some examples, the LSTM encoder comprises a bi-directional LSTM encoder.

Some examples of the method, apparatus, and non-transitory computer-readable medium described above may further include decoding the encoded video information using an LSTM decoder to produce a caption sentence, wherein embedding the encoded video information comprises embedding the caption sentence. In some examples, the embedding model comprises a sentence embedding model.

Some examples of the method, apparatus, and non-transitory computer-readable medium described above may further include generating a search query vector based on the search query using a sentence embedding model. Some examples may further include inputting the encoded video information and the search query vector into the embedding model, wherein the embedding model comprises one or more first layers for embedding encoded video information and one or more second layers for embedding sentence vectors.

A method, apparatus and non-transitory computer-readable medium storing code for content-based video retrieval is described. Embodiments may include selecting a plurality of video frames from a video clip, generating a video feature vector based on the plurality of video frames, encoding the video feature vector to produce encoded video information, decoding the encoded video information to produce a caption sentence, embedding the caption sentence using a sentence embedding model, embedding a search query using the sentence embedding model, and calculating a distance between the embedded encoded video information and the embedded search query.

In some examples, the video feature vector is encoded using a bi-directional LSTM encoder. In some examples, the encoded video information is decoded using a bi-directional LSTM encoder.

Some examples of the method, apparatus, and non-transitory computer-readable medium described above may further include generating a first word vector based on the encoded video information. Some examples may further include generating a first probability vector by applying a softmax function to the first word vector. Some examples may further include identifying a first word based on the caption sentence based on the first probability vector.

Some examples of the method, apparatus, and non-transitory computer-readable medium described above may further include identifying a subsequent word of the caption sentence based on the first word.

A method, apparatus and non-transitory computer-readable medium storing code for content-based video retrieval is described. Embodiments may include selecting a plurality of video frames from a video clip, generating a video feature vector based on the plurality of video frames, encoding the video feature vector to produce encoded video information, embedding the encoded video information using a joint video-sentence embedding model, embedding a search query using the joint video-sentence embedding model, and calculating a distance between the embedded encoded video information and the embedded search query.

Some examples of the method, apparatus, and non-transitory computer-readable medium described above may further include generating a search query vector based on the search query using a sentence embedding model, wherein the search query is embedded based on the search query vector.

Some examples of the method, apparatus, and non-transitory computer-readable medium described above may further include applying a first unit weight matrix to the encoded video information. Some examples may further include applying a first non-linear rectified linear activation unit to the encoded video information. Some examples may further include applying a second unit weight matrix to the encoded video information. Some examples may further include applying a third unit weight matrix to the search query vector. Some examples may further include applying a second non-linear rectified linear activation unit to the search query vector. Some examples may further include applying a third unit weight matrix to the search query vector.

Some examples of the method, apparatus, and non-transitory computer-readable medium described above may further include normalizing the encoded video information and the search query vector. In some examples, the encoded video information has a different number of dimensions from the search query vector.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media, including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on."

What is claimed is:
1. A method of video retrieval, comprising:
  selecting a plurality of video frames from a video clip;
  generating a video feature vector comprising a frame feature vector for each of the video frames;
  generating encoded video information based on the video feature vector, wherein the encoded video information includes temporal information based on a temporal relationship among the plurality of video frames;
  embedding a search query in an embedding space;
  comparing the encoded video information and the embedded search query; and
  providing an indication of the video clip based on the comparison.
2. The method of claim 1, further comprising:
  identifying a plurality of video clips;
  selecting one or more of the plurality of video clips based at least in part on the calculated distance; and presenting the one or more of the of the plurality of video clips to the user in response to receiving the search query.

3. The method of claim 1, further comprising:
identifying a predetermined number of video frames for the video clip, wherein the plurality of video frames comprise equally spaced frames selected based on the predetermined number and a size of the video clip.

4. The method of claim 1, further comprising:
resizing each of the plurality of video frames according a predetermined size, wherein the video feature vector is generated based on the resized video frames.

5. The method of claim 1, further comprising:
inputting the plurality of video frames into a video feature extraction model, wherein the video feature vector comprises an output of the video feature extraction model.

6. The method of claim 5, wherein:
the video feature extraction model comprises a convolutional neural network (CNN) and one or more fully connected layers.

7. The method of claim 1, further comprising:
inputting the video feature vector into a long short-term memory (LSTM) encoder, wherein the encoded video information comprises an output of the LSTM encoder.

8. The method of claim 1, further comprising:
embedding the encoded video information into the embedding space using a joint video-sentence embedding model.

9. The method of claim 1, further comprising:
decoding the encoded video information using a long short-term memory (LSTM) decoder to produce a caption sentence; and
embedding the caption sentence in the embedding space.

10. The method of claim 1, further comprising:
generating a search query vector based on the search query using a sentence embedding model; and
inputting the encoded video information and the search query vector into the embedding model, wherein the embedding model comprises one or more first layers for embedding encoded video information and one or more second layers for embedding sentence vectors.

11. A method of video retrieval, comprising:
generating a video feature vector based on the plurality of video frames of a video clip;
encoding the video feature vector to produce encoded video information, wherein the encoded video information includes temporal information based on a temporal relationship of the plurality of video frames;
decoding the encoded video information to produce a caption sentence;
embedding the caption sentence in an embedding space;
receiving a search query from a user;
embedding the search query in the embedding space;
calculating a distance between the embedded caption sentence and the embedded search query; and
providing an indication of the video clip to the user based on the calculated distance.

12. The method of claim 11, wherein:
the video feature vector is encoded using a bi-directional long short-term memory (LSTM) encoder.

13. The method of claim 11, wherein:
the encoded video information is decoded using a bi-directional LSTM encoder.

14. The method of claim 11, further comprising:
generating a first word vector based on the encoded video information;
generating a first probability vector by applying a softmax function to the first word vector; and
identifying a first word based of the caption sentence based on the first probability vector.

15. The method of claim 14, further comprising:
identifying a subsequent word of the caption sentence based on the first word.

16. A method of video retrieval, comprising:
generating a video feature vector based on the plurality of video frames of a video clip;
encoding the video feature vector to produce encoded video information, wherein the encoded video information includes temporal information based on a temporal relationship of the plurality of video frames;
embedding the encoded video information using a joint video-sentence embedding model, wherein the joint video-sentence embedding model comprises a first input branch for the encoded video information and a second input branch for sentences;
receiving a search query from a user;
embedding the search query using the joint video-sentence embedding model;
calculating a distance between the embedded encoded video information and the embedded search query; and
providing an indication of the video clip to the user based on the calculated distance.

17. The method of claim 16, further comprising:
generating a search query vector based on the search query using a sentence embedding model, wherein the search query is embedded based on the search query vector.

18. The method of claim 17, further comprising:
apply a first unit weight matrix to the encoded video information;
apply a first non-linear rectified linear activation unit to the encoded video information;
apply a second unit weight matrix to the encoded video information;
apply a third unit weight matrix to the search query vector;
apply a second non-linear rectified linear activation unit to the search query vector; and
apply a third unit weight matrix to the search query vector.

19. The method of claim 18, further comprising:
normalizing the encoded video information and the search query vector.

20. The method of claim 18, wherein:
the encoded video information has a different number of dimensions from the search query vector.

* * * * *